United States Patent
Tsirkin (10) Patent No.: US 8,914,803 B2
(45) Date of Patent: Dec. 16, 2014

(54) FLOW CONTROL-BASED VIRTUAL MACHINE REQUEST QUEUING

(75) Inventor: Michael Tsirkin, Yokneam Yillit (IL)

(73) Assignee: Red Hat Israel, Ltd., Raanana (IL)

( * ) Notice: Subject to any disclaimer, the term of this patent is extended or adjusted under 35 U.S.C. 154(b) by 601 days.

(21) Appl. No.: 13/218,143

(22) Filed: Aug. 25, 2011

(65) Prior Publication Data

US 2013/0055245 A1    Feb. 28, 2013

(51) Int. Cl.
*G06F 9/46* (2006.01)
*G06F 9/455* (2006.01)
*G06F 9/54* (2006.01)

(52) U.S. Cl.
CPC ............ *G06F 9/545* (2013.01); *G06F 9/45558* (2013.01); *G06F 2209/5013* (2013.01)
USPC ................................ 718/103; 718/102; 718/1

(58) Field of Classification Search
CPC ............................ G06F 9/45533; G06F 9/5005
See application file for complete search history.

(56) References Cited

U.S. PATENT DOCUMENTS

| 8,332,857 | B1 * | 12/2012 | Brown et al. | 718/103 |
| 2011/0029598 | A1 * | 2/2011 | Arnold et al. | 709/203 |
| 2011/0205588 | A1 * | 8/2011 | Yabe | 358/1.15 |

OTHER PUBLICATIONS

"Transparently Achieving Superior Socket Performance Using Zero Copy Socket Direct Protocol over 20Gb/s InfiniBand Links" (2005) IEEE.

* cited by examiner

*Primary Examiner* — Meng An
*Assistant Examiner* — Bing Zhao
(74) *Attorney, Agent, or Firm* — Lowenstein Sandler LLP (57) ABSTRACT

A mechanism for flow control-based virtual machine (VM) request queuing is disclosed. A method of the invention includes implementing a pass-through mode for handling of one or more requests sent to a hypervisor by a virtual machine (VM) managed by the hypervisor, determining that a number of outstanding requests associated with the VM has exceeded a first threshold, implementing a queued mode for handling the one or more requests sent to the hypervisor from the VM, determining that a number of outstanding requests associated with the VM has fallen below a second threshold, implementing the pass-through mode for handling the one or more requests sent to the hypervisor from the VM, and repeating the implementing and determining as long as the VM continues to send requests to the hypervisor.

18 Claims, 5 Drawing Sheets

FLOW CONTROL-BASED VIRTUAL MACHINE REQUEST QUEUING

TECHNICAL FIELD

The embodiments of the invention relate generally to virtualization systems and, more specifically, relate to a mechanism for flow control-based virtual machine (VM) request queuing.

BACKGROUND

In computer science, a virtual machine (VM) is a portion of software that, when executed on appropriate hardware, creates an environment allowing the virtualization of an actual physical computer system. Each VM may function as a self-contained platform, running its own operating system (OS) and software applications (processes). Typically, a hypervisor manages allocation and virtualization of computer resources and performs context switching, as may be necessary, to cycle between various VMs.

A host machine (e.g., computer or server) is typically enabled to simultaneously run multiple VMs, where each VM may be used by a local or remote client. The host machine allocates a certain amount of the host's resources to each of the VMs. Each VM is then able to use the allocated resources to execute applications, including operating systems known as guest operating systems. The hypervisor virtualizes the underlying hardware of the host machine or emulates hardware devices, making the use of the VM transparent to the VM operating system or the remote client that uses the VM.

Communication between the VM and the hypervisor is a key component in any virtualization system. A VM is generally passes requests to the hypervisor to be acted upon by the hypervisor. For example, a request may include a request from the VM to transmit a packet to the host machine or to a network that the host machine is connected to. The ability of the hypervisor to immediately notify a VM that a request passed to the hypervisor from the VM has been handled is advantageous because it allows the hypervisor to continue to receive more requests. This, in turn, keeps processing speed and responsiveness of the VM optimized.

When the hypervisor receives a request from a VM that it manages, it will need to communicate with the VM that it has processed the request. In one case, the hypervisor could handle the request immediately upon receipt and only notify the VM that the request has been handled when the hypervisor is done processing. However, a drawback to this approach is that VMs will be delayed while they are waiting to receive confirmation from the hypervisor that a request has been handled. In addition, the hypervisor will not be able to receive additional requests until it has finished processing prior requests. This will result in slower processing and responsiveness of the virtualization system overall.

Instead of immediately handling a request and then notify a VM, another approach is for the hypervisor to queue the request, notify the VM that the request is handled, and then handle the request in the background. Queuing in this context means retrieving information from the request, which generally should be done first. Using this approach, the hypervisor can continue to receive requests from the VM as the VM believes that the previous requests have been processed. However, a potential for inefficiencies can result due to queue size limitations, which, in turn, limits the number of requests that can be queued. In order to keep receiving requests, the hypervisor may copy requests out of VM memory and into a queue in the hypervisor or host machine memory in order to prevent requests in the VM memory from being overwritten by new incoming requests. However, depending upon the request, there are costs in terms of copying time and memory space.

One current approach to address this copying limitation, which has been utilized in fields other than virtualization, is to limit copying of requests to a size threshold. In other words, performing a copy of a request to memory only if the size of the request is larger than a threshold. If the request is smaller than the threshold size, then the request is queued. However, because requests vary in size (e.g., small requests mixed with large requests), this means that requests may be handled out of order. Out-of-order processing can become complicated for the VM, leading to sub-par VM processing and performance.

BRIEF DESCRIPTION OF THE DRAWINGS

Embodiments of the invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

Embodiments of the invention provide a mechanism for flow control-based virtual machine (VM) request queuing. A method of embodiments of the invention includes implementing a pass-through mode for handling of one or more requests sent to a hypervisor by a virtual machine (VM) managed by the hypervisor, determining that a number of outstanding requests associated with the VM has exceeded a first threshold, implementing a queued mode for handling the one or more requests sent to the hypervisor from the VM, determining that a number of outstanding requests associated with the VM has fallen below a second threshold, implementing the pass-through mode for handling the one or more requests sent to the hypervisor from the VM, and repeating the implementing and determining as long as the VM continues to send requests to the hypervisor.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "attaching", "forwarding", "caching", "determining", "implementing", "repeating", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a machine readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (non-propagating electrical, optical, or acoustical signals), etc.

Embodiments of the invention provide a mechanism for flow control-based VM request queuing. When receiving networking requests (e.g., send packet requests) from a VM at the hypervisor, two different queuing modes are possible based on the number of outstanding requests at the hypervisor for the particular VM. The hypervisor begins in a pass-through mode where requests are handled directly and are not copied or queued. If a threshold of number of outstanding requests is exceeded, then the hypervisor switches to the queued mode, where the requests are copied and queued and the VM is notified immediately that the requests has been queued. Once the number of outstanding requests falls below a threshold, the hypervisor will fall back into the pass-through mode again. This reduces reordering of requests, eliminates guessing of request size, and, in some cases, may allow the VM to control the mode that the hypervisor is in.

Figure 1:
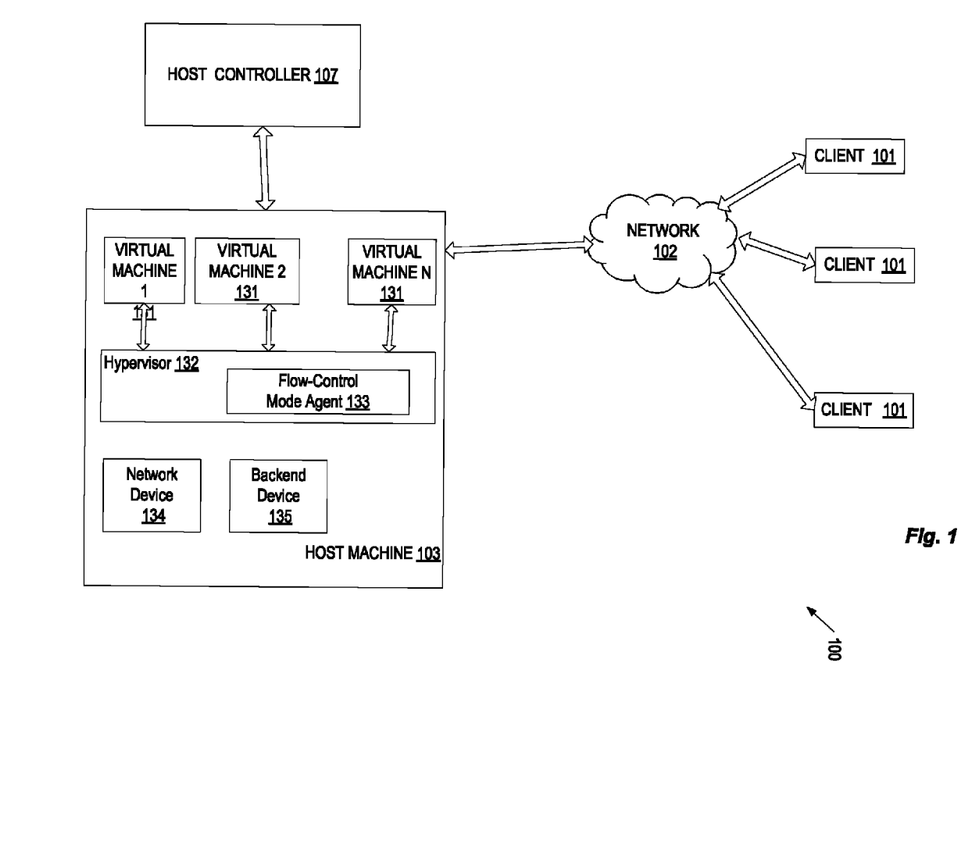
FIG. 1 is a block diagram of an exemplary virtualization system network architecture in which embodiments of the present invention may operate.

FIG. 1 illustrates an exemplary virtualization system network architecture 100 in which embodiments of the present invention may operate. The network architecture 100 may include a host machine 103 coupled to one or more clients 101 over a network 102. The network 102 may be a private network (e.g., a local area network (LAN), wide area network (WAN), intranet, etc.) or a public network (e.g., the Internet). In other embodiments, the host machine 103 and clients 101 may be part of the same machine. The host 103 may be coupled to a host controller 107 (via a network or directly). Alternatively, the host controller 107 may be part of the host 103.

In one embodiment, the clients 101 may include computing devices that have a wide range of processing capabilities. Some or all of the clients 101 may be thin clients, which serve as access terminals for users and depend primarily on the host 103 for processing activities. For example, the client 101 may be a desktop computer, laptop computer, cellular phone, personal digital assistant (PDA), etc. The client 101 may run client applications such as a Web browser and a graphic user interface (GUI). The client 101 may also run other client applications to receive multimedia data streams or other data sent from the host 103 and re-direct the received data to a display or other user interface.

In one embodiment, the host 103 is a server machine or a cluster of server machines that run one or more VMs 131. Each VM 131 runs a guest operating system (OS) that may be different from one another. The guest OS may include Microsoft Windows, Linux, Solaris, Mac OS, etc. The host 103 also includes a hypervisor 132 that emulates the underlying hardware platform for the VMs 131. The hypervisor 132 may also be known as a VM monitor (VMM), a kernel-based hypervisor or a host operating system.

Each VM 131 can be accessed by one or more of the clients 101 over the network 102. In one scenario, the VM 131 can provide a virtual desktop for the client 101. The VMs 131 can be managed by the host controller 107. The host controller 107 may also add a VM, delete a VM, balance the load on the server cluster, provide directory service to the VMs 131, and perform other management functions.

The hypervisor 132 receives requests from the VMs 131 that is manages. For instance, the hypervisor will typically receive a 'send packet' request or a 'write data' request from a VM 131, asking the hypervisor 132 to forward a packet from the VM 131 onto a network device 134 or a backend device 135 of the host machine 103. In one embodiment the network device 134 may be a Network Interface Card (NIC), a network bridge, or a software network device. Backend devices 135 may include a disk or a file on host file system used as a backend for storage in the VM 131 or a terminal used as a backend for a serial device emulation in the VM 131. In embodiments of the invention, the hypervisor 132 uses two different flow-control modes for handling these requests passed from the VM 131, a pass-through mode and a queued mode. The determination of which mode to implement is based on the number of outstanding requests for the hypervisor 131 associated with the particular VM 131.

In one embodiment, a flow control mode agent 133 in the hypervisor 132 controls the selection and implementation of the flow control mode of the hypervisor 132. Initially, the hypervisor 132 begins in the pass-through mode. In embodiments of the invention, flow control mode agent 133 may be implemented in software, hardware, firmware, or some combination of the above. The pass-through mode entails the hypervisor 132 directly passing on a received request to the device or module, such as network device 134 or backend device 145 of host machine 103, which would handle processing of the request. In pass-through mode, no copying or queuing of the request is performed by the hypervisor 132. Once the request is passed on, the hypervisor 132 notifies the VM 131 that the request has been processed.

If a threshold of number of outstanding requests from the VM 131 to the hypervisor is exceeded, then the flow control mode agent 133 directs the hypervisor 132 to switch to the queued mode for that VM 131. In some embodiments, the hypervisor 132 tracks outstanding requests per VM 131, and switches between flow control modes on a per-VM 131 basis. In queued mode, VM 131 requests are copied and queued by the hypervisor 132 and the VM 131 is notified immediately that its request has been queued. To the VM 131, it appears as if the request has been processed and the VM 131 may continue sending more requests to the hypervisor 132. As requests are generally all networking-based 'send packet' requests, informing the VM that a requests has been processed before it actually is processed will not prove harmful. For other backend types, such as storage backends, only some types of requests, such as write requests, might be queued in this way. Once a request is in the queue at the hypervisor 132, the hypervisor 132 will process the request in the background once resources become available to handle the request.

When the number of outstanding requests falls below a threshold (that may be different than threshold for switching from pass-through to queued mode), the hypervisor 132 falls back into the pass-through mode. This mode switching based on number of outstanding requests of embodiments of the invention reduces reordering of requests, eliminates guessing of request size, and, in some cases, may allow the VM to control the mode that the hypervisor is in.

Figure 2:
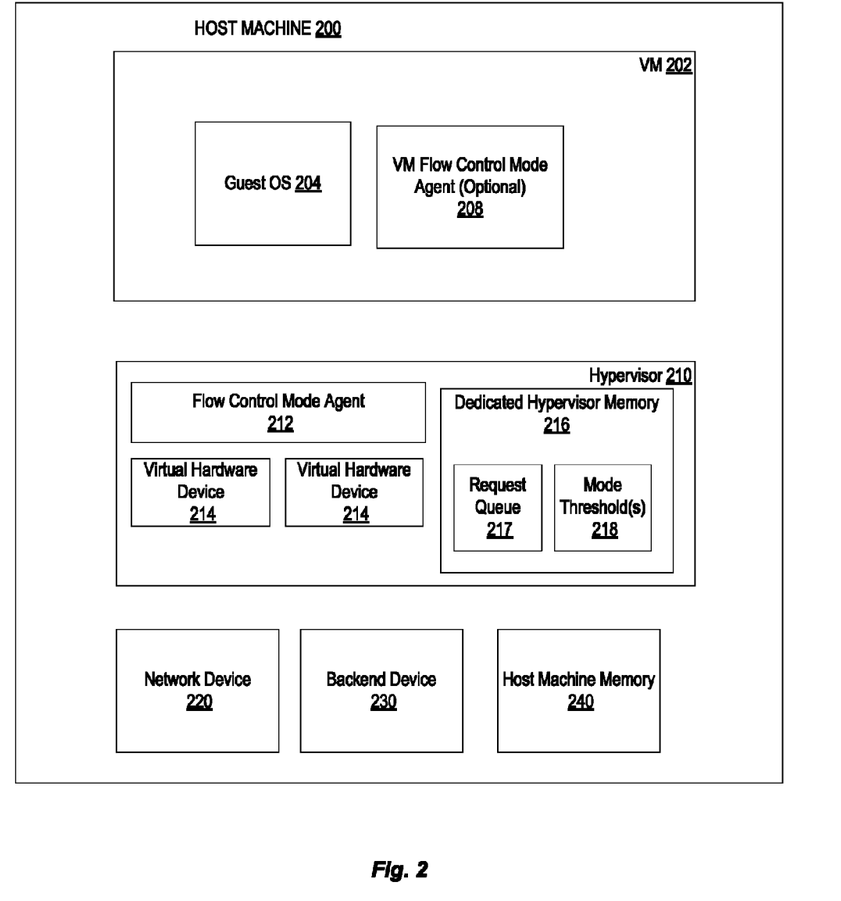
FIG. 2 is a block diagram of a more detailed view of a host machine implementing flow control-based Virtual Machine (VM) request queuing according to embodiments of the invention.

Embodiments of the invention are presently further described with respect to FIG. 2, which is a block diagram depicting a more detailed view of a host machine 200 implementing flow control-based VM request queuing according to embodiments of the invention. In one embodiment, host machine 200 is the same as host machine 103 described with respect to FIG. 1.

As illustrated, host machine 200 includes a hypervisor 210 hosting one or more VMs 202. For simplicity of illustration, only one VM 202 is shown. In addition, host machine includes a network device 220, a backend device 230, and a host machine memory 240. In one embodiment, VM 202 includes a guest OS 204 that may produce one or more requests to be passed on to the hypervisor 210. In one embodiment, the requests may be 'send packet' requests for networking purposes.

With respect to receiving requests from the VM 202, hypervisor 210 may operate in one of two flow control modes as detailed above with respect to FIG. 1: a pass-through mode and a queued mode. A flow control mode agent 212 of hypervisor 212 monitors and directs the flow control mode that the hypervisor 210 operates in. Initially, flow control mode agent 212 will start hypervisor 210 in the pass-through mode, where requests are passed directly through the hypervisor 210 onto the device or module in charge of processing the request. For example, the hypervisor 210 would pass a VM 202 request directly onto the network device 220, backend device 230, or virtual hardware device 214, identified as the destination for processing. In some embodiments, the request itself may identify its end location, or in other cases the hypervisor 210 may determine based on the contents of the packet where it should be directed.

In embodiments of the invention, flow control mode agent 212 also operates to monitor the number of outstanding requests associated with each VM 202 hosted by hypervisor 210. In one embodiment, the number of outstanding requests may be determined by the hypervisor 210. The hypervisor 210 can either track the requests as they are passed from the VM 202 and completed. In that case, outstanding requests=requested−completed. In another embodiment, the hypervisor 210 can query the backend. Determine the number of outstanding request may also be determined by code executed by the VM 202, again by outstanding requests=requested−completed.

The flow control mode agent monitors the number of outstanding requests at any time and compares this number to a first threshold number for flow control modes. In one embodiment, this first threshold number is kept in mode threshold memory 218 found in dedicated hypervisor memory 216. The first threshold number may be a default number set by an administrator or may be a specific number set by an end user of the virtualization based on operating components of the system. If the number of outstanding requests exceeds the first threshold, then flow control mode agent will switch the flow control mode of hypervisor 210 into queued mode.

In queued mode, requests received from VM 202 will be immediately copied into a request queue. In one embodiment, request queue 217 is also stored in dedicated hypervisor memory 216. In another embodiment, request queue 217 may be stored in host machine memory 240. In addition to copying a request to the queue 217, the hypervisor 210 also immediately notifies the VM 202 that the request has been queued. In this way, VM 202 will continue sending requests with the assumption that the previous request has been processed.

Flow control mode agent 212 continues to monitor the number of outstanding requests associated with VM 202. When the number of outstanding requests falls below a second threshold, the flow control mode agent 212 switches the hypervisor 210 back into the pass-through mode. In one embodiment, the second threshold is also stored in mode threshold memory 218. In some embodiments, the second threshold may be the same as the first threshold discussed above for switching from pass-through mode to queued mode. In other embodiments, the first and second threshold amounts may differ. However, the second threshold should be less than or equal to the first threshold in order for embodiments of the invention to work.

In another embodiment, the VM 202 itself may monitor and detect the number of outstanding requests it has sent to hypervisor 210 and then notify the hypervisor when the hypervisor 210 needs to switch between pass-through and queued modes based on the threshold numbers. In this case a VM flow control mode agent 208 at the VM 202 may perform the monitoring and notification with respect to flow control modes. In one embodiment, the mode notification is combined with the next request, which reduces the overhead of VM-to-host machine communication. In some embodiments, the mode threshold numbers will also be stored in memory associated with the VM. This embodiment gives the VM control of mode switching and offloads some processing load from the hypervisor 210.

Figure 3:
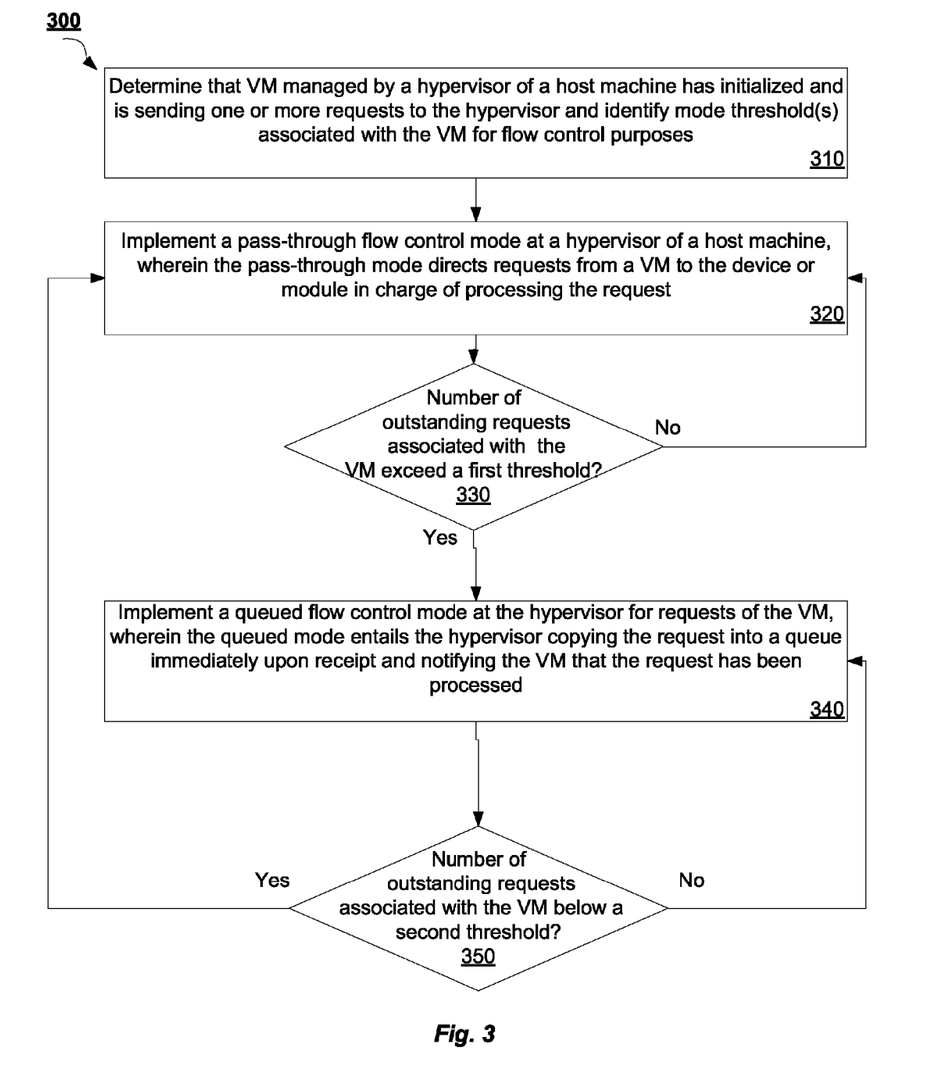
FIG. 3 is a flow diagram illustrating a method for flow control-based VM request queuing according to an embodiment of the invention.

FIG. 3 is a flow diagram illustrating a method 300 for flow control-based virtual machine (VM) request queuing according to an embodiment of the invention. Method 300 may be performed by processing logic that may comprise hardware (e.g., circuitry, dedicated logic, programmable logic, microcode, etc.), software (such as instructions run on a processing device), firmware, or a combination thereof. In one embodiment, method 300 is performed by flow control mode agent 212 of host machine 200 described with respect to FIG. 2.

Method 300 begins at block 310 where it is determined that a VM managed by the hypervisor executing the flow control mode agent has initialized. In addition, it is determined that one or more requests are being sent to the hypervisor from the VM. As part of this determination, one or more mode thresholds associated with the particular VM are identified for flow control purposes. In one embodiment, a first threshold and a second threshold associated with the VM, which may or may not be the same, are located in mode threshold memory. Theses thresholds may be default values provided by an administrator or may be specific values tailored to the virtualization system including the host machine executing the VM.

At block 320, a pass-through mode is implemented at the hypervisor. The pass-through mode directs requests from the VM to a device or module that is in charge of processing the request. In some embodiments, the request itself may identify the device or module end destination, or in other cases, the hypervisor may determine the location to direct the request based on the contents of the packet associated with the request.

Subsequently, at decision block 330, it is determined whether the number of outstanding requests sent from the VM to the hypervisor exceeds a first threshold. In one embodiment, the number of outstanding requests is determined by the hypervisor. The hypervisor can either track the requests as they are passed from the VM and completed. In that case, outstanding requests=requested−completed. In another embodiment, the hypervisor can query the backend. Determine the number of outstanding request may also be determined by code executed by the VM, again by outstanding requests=requested−completed. If the number of outstanding requests does not exceed the first threshold, then method 300 returns to block 320 to continue implementation of the pass-through mode for requests from the VM.

On the other hand, if the number of outstanding requests does exceed the first threshold, then method 300 continues to block 340 where a queued flow control mode is implemented at the hypervisor for requests for the VM. The queued mode entails the hypervisor copying the request into a queue immediately upon receipt of the request, and notifying the VM that the request has been processed. In one embodiment, the queue may be stored in dedicated hypervisor memory or in the general host machine memory. Once the VM has been notified, the request is processed in the background when resources become available.

Subsequently, at decision block 350, it is determined whether the number of outstanding requests sent from the VM to the hypervisor falls below a second threshold. In some embodiments the second threshold is different than the first threshold, while in other embodiments they may be the same. If the number of outstanding requests does not fall below the second threshold, then method 300 returns to block 340 to continue receiving requests from the VM in the queued mode.

On the other hand, if the number of outstanding requests does fall below the second threshold, then method 300 returns to block 320 to switch back to the implementation of the pass-through mode.

Figure 4:
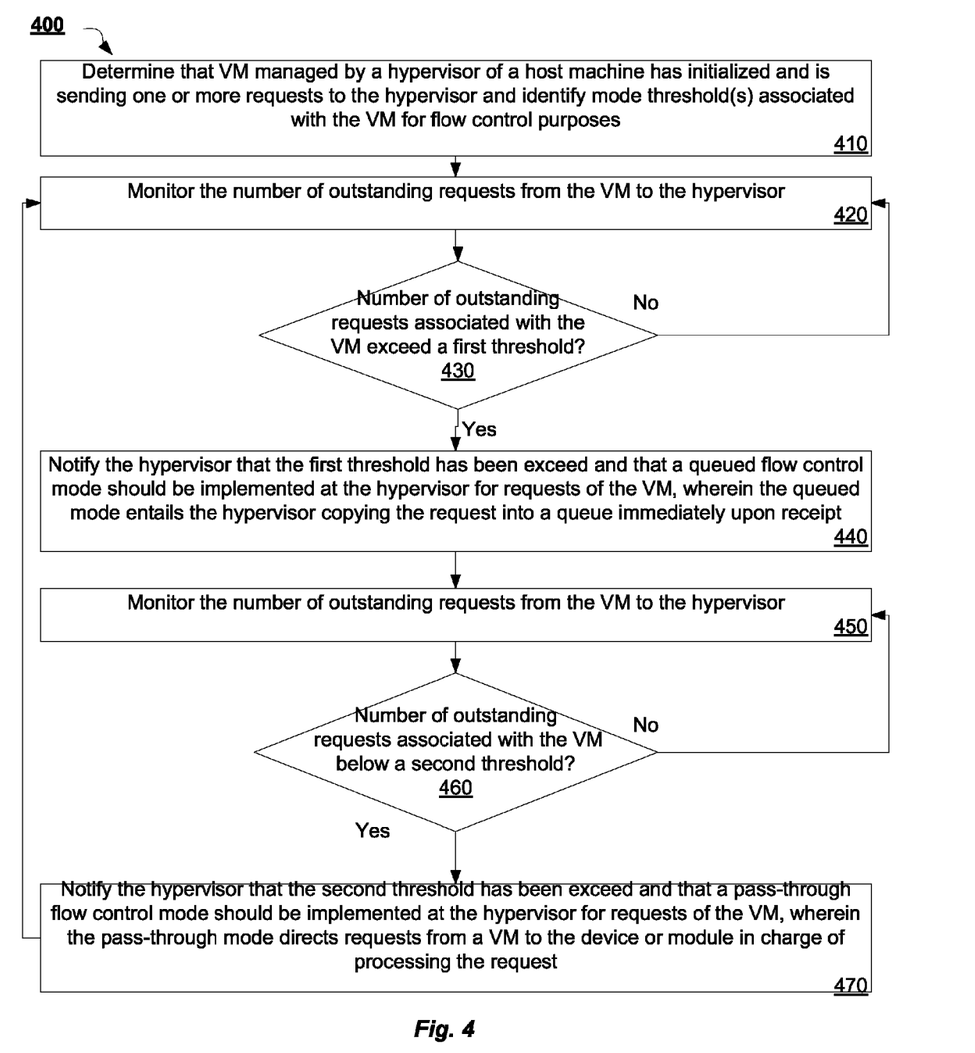
FIG. 4 is a flow diagram illustrating another method for flow control-based VM request queuing according to an embodiment of the invention.

FIG. 4 is a flow diagram illustrating another method 400 for flow control-based virtual machine (VM) request queuing according to an embodiment of the invention. Method 400 may be performed by processing logic that may comprise hardware (e.g., circuitry, dedicated logic, programmable logic, microcode, etc.), software (such as instructions run on a processing device), firmware, or a combination thereof. In one embodiment, method 400 is performed by VM flow control mode agent 208 of VM 202 of host machine 200 described with respect to FIG. 2.

Method 400 begins at block 410 where it is determined that a VM executing the VM flow control mode agent has initialized. In addition, it is determined that the VM is sending one or more requests to a hypervisor managing the VM. As part of this determination, one or more mode thresholds associated with the particular VM are identified for flow control purposes. In one embodiment, a first threshold and a second threshold associated with the VM, which may or may not be the same, are located in mode threshold memory. Theses thresholds may be default values provided by an administrator or may be specific values tailored to the virtualization system including the VM.

Then, at block 420, the VM flow control mode agent monitors the number of outstanding requests from VM to the hypervisor. In one embodiment, the number of outstanding requests is determined by the hypervisor. The hypervisor can either track the requests as they are passed from the VM and completed. In that case, outstanding requests=requested−completed. In another embodiment, the hypervisor can query the backend. Determine the number of outstanding request may also be determined by code executed by the VM, again by outstanding requests=requested−completed. At decision block 430, the VM flow control mode agent determines whether the number of outstanding requests exceeds a first threshold. If the number of outstanding requests does not exceed the first threshold, then method 400 returns to block 420 where the VM flow control mode agent continues to monitor the number of outstanding requests from the VM to the hypervisor.

On the other hand, if the number of outstanding requests does exceed the first threshold, then method 400 continues to block 440 where the VM flow control mode agent notifies the hypervisor that the number of outstanding requests exceeded the first threshold so that the hypervisor will implement a queued flow control mode for handling requests from the VM. The queued mode entails the hypervisor copying the request into a queue immediately upon receipt of the request, and notifying the VM that the request has been processed. In one embodiment, the queue may be stored in dedicated hypervisor memory or in the general host machine memory. Once the VM has been notified, the request is processed in the background when resources become available. Subsequently, at block 450, the VM flow control mode agent continues to monitor the number of outstanding requests from VM to the hypervisor.

At decision block 460, it is determined whether the number of outstanding requests sent from the VM to the hypervisor falls below a second threshold. In some embodiments the second threshold is different than the first threshold, while in other embodiments they may be the same. If the number of outstanding requests does not fall below the second threshold, then method 400 returns to block 450 where to continue monitoring the number of outstanding requests sent from the VM to the hypervisor.

On the other hand, if the number of outstanding requests does fall below the second threshold, then method 400 continues to block 470 where the VM flow control mode agent notifies the hypervisor that the number of outstanding requests fell below the second threshold so that the hypervisor will implement a pass-through flow control mode for handling requests from the VM. The pass-through mode entails the hypervisor directing requests from the VM to a device or module that is in charge of processing the request. In some embodiments, the request itself may identify the device or module end destination, or in other cases, the hypervisor may determine the location to direct the request based on the contents of the packet associated with the request. It is this pass-through mode that the hypervisor initially began with when fielding requests from the VM before the first threshold was exceeded at decision block 430.

Figure 5:
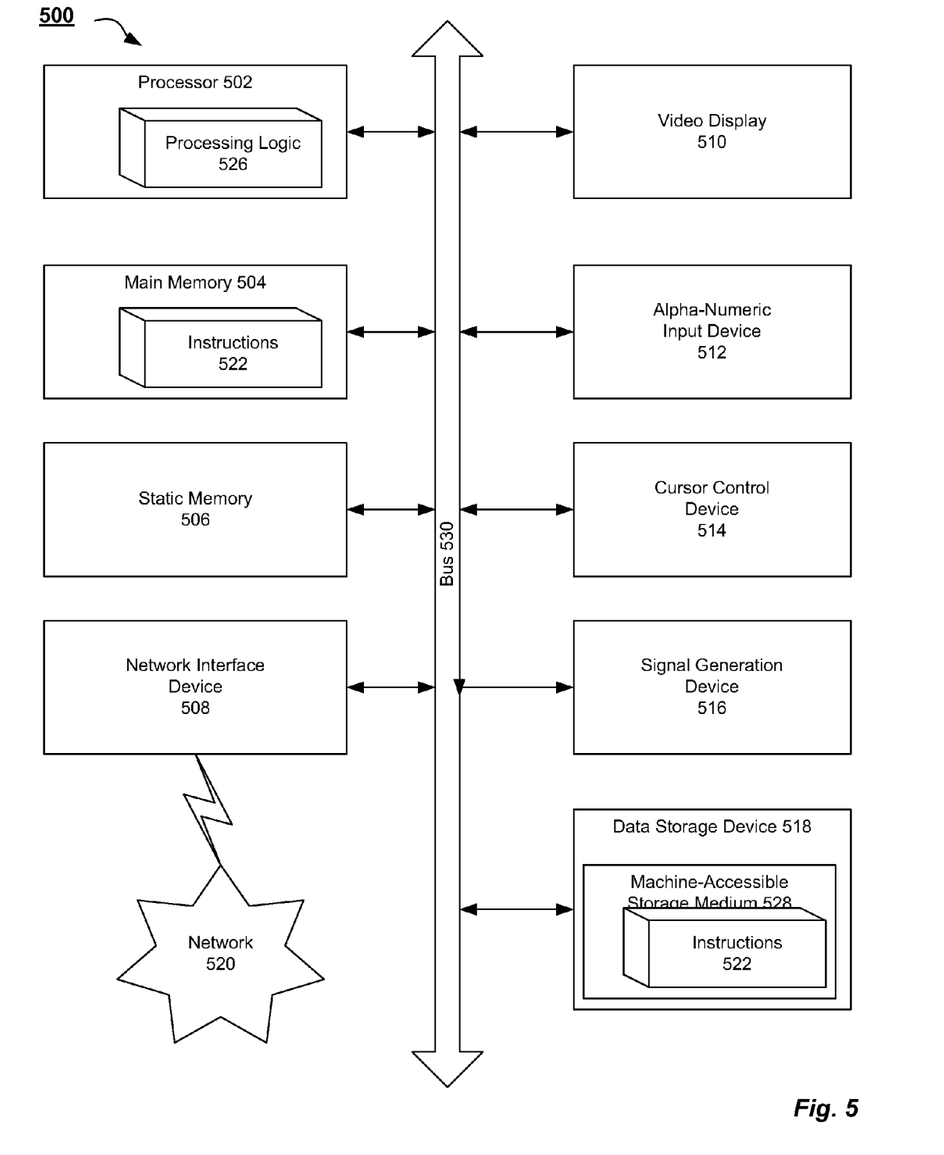
FIG. 5 illustrates a block diagram of one embodiment of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) (such as synchronous DRAM (SDRAM) or Rambus DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 528 on which is stored one or more set of instructions (e.g., software 522) embodying any one or more of the methodologies of functions described herein. For example, software 522 may store instructions to perform flow control-based virtual machine (VM) request queuing by flow control mode agent 133 of host machine 103 described with respect to FIG. 1. The software 522 may also reside, completely or at least partially, within the main memory 504 and/or within the processing device 502 during execution thereof by the computer system 500; the main memory 504 and the processing device 502 also constituting machine-accessible storage media. The software 522 may further be transmitted or received over a network 520 via the network interface device 508.

The machine-readable storage medium 528 may also be used to store instructions to perform methods 300 and 400 for flow control-based virtual machine (VM) request queuing described with respect to FIGS. 3 and 4, and/or a software library containing methods that call the above applications. While the machine-accessible storage medium 528 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present invention. The term "machine-accessible storage medium" shall accordingly be taken to include, but not be limited to, solid-state memories, and optical and magnetic media.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
  implementing, by a hypervisor executed by a processing device of a host machine, a pass-through mode to handle requests sent to the hypervisor by a virtual machine (VM) managed by the hypervisor, wherein the pass-through mode comprises the hypervisor directing the requests from the VM to at least one of a device or a module of the host machine that can handle the request;
  determining, by the hypervisor subsequent to the implementing the pass-through mode, that a number of outstanding requests corresponding to the VM exceeds a first threshold;
  implementing, by the hypervisor in view of the determining the number of outstanding requests exceeds the first threshold, a queued mode to handle the requests, wherein the queued mode comprises copying the requests to a queue of the hypervisor immediately upon receipt of the requests and notifying the VM that the requests have been queued;

determining, by the hypervisor, that the number of outstanding requests corresponding to the VM is below a second threshold; and returning, by the hypervisor in view of the determining the number of outstanding requests is below the second threshold, the VM to the pass-through mode to handle the requests.

2. The method of claim 1, wherein the one or more requests comprise at least one of a send packet request or a write data request.

3. The method of claim 1, wherein the VM notifies the hypervisor that the number of outstanding requests exceeds the first threshold and that the number of outstanding requests is below the second threshold.

4. The method of claim 3, wherein a VM flow control mode agent executed by the VM monitors the number of outstanding requests and sends a notification to the hypervisor.

5. The method of claim 4, wherein the VM flow control mode agent sends the notification to the hypervisor as part of a next request sent to the VM to be handled by the VM.

6. The method of claim 1, wherein the first threshold and the second threshold are different and the second threshold is less than or equal to the first threshold.

7. A system, comprising:
a memory;
a processing device communicably coupled to the memory;
a hypervisor to execute one or more virtual machines (VMs) from the memory that share use of the processing device, the hypervisor to:
implement a pass-through mode to handle requests sent to the hypervisor by a VM of the one or more VMs executed by the hypervisor, wherein the pass-through mode comprises the hypervisor directing the requests from the VM to at least one of a device or a module of the host machine that can handle the request;
determine, subsequent to the implementing the pass-through mode, that a number of outstanding requests corresponding to the VM exceeds a first threshold;
implement, in view of the determining the number of outstanding requests exceeds the first threshold, a queued mode to handle the requests, wherein the queued mode comprises copying the requests to a queue of the hypervisor immediately upon receipt of the requests and notifying the VM that the requests have been queued;
determine that the number of outstanding requests corresponding to the VM is below a second threshold; and
return, in view of the determining the number of outstanding requests is below the second threshold, the VM to the pass-through mode to handle.

8. The system of claim 7, wherein the one or more requests comprise at least one of a send packet request or a write data request.

9. The system of claim 7, wherein the VM notifies the hypervisor that the number of outstanding requests exceeds the first threshold and that the number of outstanding requests is below the second threshold.

10. The system of claim 9, wherein a VM flow control mode agent executed by the VM monitors the number of outstanding requests and sends a notification to the hypervisor.

11. The system of claim 10, wherein the VM flow control mode agent sends the notification to the hypervisor as part of a next request sent to the VM to be handled by the VM.

12. The system of claim 7, wherein the first threshold and the second threshold are different and the second threshold is less than or equal to the first threshold.

13. A non-transitory machine-readable storage medium including instructions that, when accessed by a processing device, cause the processing device to perform operations comprising:
implementing, by a hypervisor executed by the processing device of a host machine, a pass-through mode to handle requests sent to the hypervisor by a virtual machine (VM) managed by the hypervisor, wherein the pass-through mode comprises the hypervisor directing the requests from the VM to at least one of a device or a module of the host machine that can handle the request;
determining, by the hypervisor subsequent to the implementing the pass-through mode, that a number of outstanding requests corresponding to the VM exceeds a first threshold;
implementing, by the hypervisor in view of the determining the number of outstanding requests exceeds the first threshold, a queued mode to handle the requests, wherein the queued mode comprises copying the requests to a queue of the hypervisor immediately upon receipt of the requests and notifying the VM that the requests have been queued;
determining, by the hypervisor, that the number of outstanding requests corresponding to the VM is below a second threshold; and
returning, by the hypervisor in view of the determining the number of outstanding requests is below the second threshold, the VM to the pass-through mode to handle the requests.

14. The non-transitory machine-readable storage medium of claim 13, wherein the one or more requests comprise at least one of a send packet request or a write data request.

15. The non-transitory machine-readable storage medium of claim 13, wherein the VM notifies the hypervisor that the number of outstanding requests exceeds the first threshold and that the number of outstanding requests is below the second threshold.

16. The non-transitory machine-readable storage medium of claim 15, wherein a VM flow control mode agent executed by the VM monitors the number of outstanding requests and sends a notification to the hypervisor.

17. The non-transitory machine-readable storage medium of claim 16, wherein the VM flow control mode agent sends the notification to the hypervisor as part of a next request sent to the VM to be handled by the VM.

18. The non-transitory machine-readable storage medium of claim 13, wherein the first threshold and the second threshold are different and the second threshold is less than or equal to the first threshold.

* * * * *